United States Patent [19]

Haferl

[11] 3,863,106

[45] Jan. 28, 1975

[54] VERTICAL DEFLECTION CIRCUIT

[75] Inventor: Peter Eduard Haferl, Adliseil, Switzerland

[73] Assignee: RCA Corporation, New York, N.Y.

[22] Filed: Apr. 16, 1973

[21] Appl. No.: 351,407

[30] Foreign Application Priority Data

Apr. 26, 1972 Great Britain .................... 19388/72

[52] U.S. Cl. ............................ 315/388, 367/228

[51] Int. Cl. ............................................ H01j 29/70

[58] Field of Search ......... 315/28, 29, 27 R, 27 TD, 315/26, 25

[56] References Cited

UNITED STATES PATENTS 3,715,621 2/1973 Schiess ........................... 315/27 TD 3,731,138 5/1973 Elias et al ....................... 315/27 TD 3,735,192 5/1973 Avery ............................. 315/27 TD 3,758,814 9/1973 Tang .............................. 315/27 TD

*Primary Examiner*—Maynard R. Wilbur

*Assistant Examiner*—J. M. Potenza

*Attorney, Agent, or Firm*—Eugene M. Whitacre; Paul J. Rasmussen

[57] ABSTRACT

A vertical deflection circuit includes a combination oscillator-sawtooth generator. The oscillator-generator includes controls for adjusting the linearity and S-correction functions simultaneously at each portion of the sawtooth waveform corresponding to the top and bottom portions of the raster. A linearity correction network coupled across one portion of a voltage divider in the sawtooth generating circuit affects only a portion of the sawtooth. Another portion of the sawtooth is corrected by a linearity network which decouples a portion of the sawtooth in a driver feedback stage.

10 Claims, 1 Drawing Figure

PATENTED JAN 28 1975 3,863,106
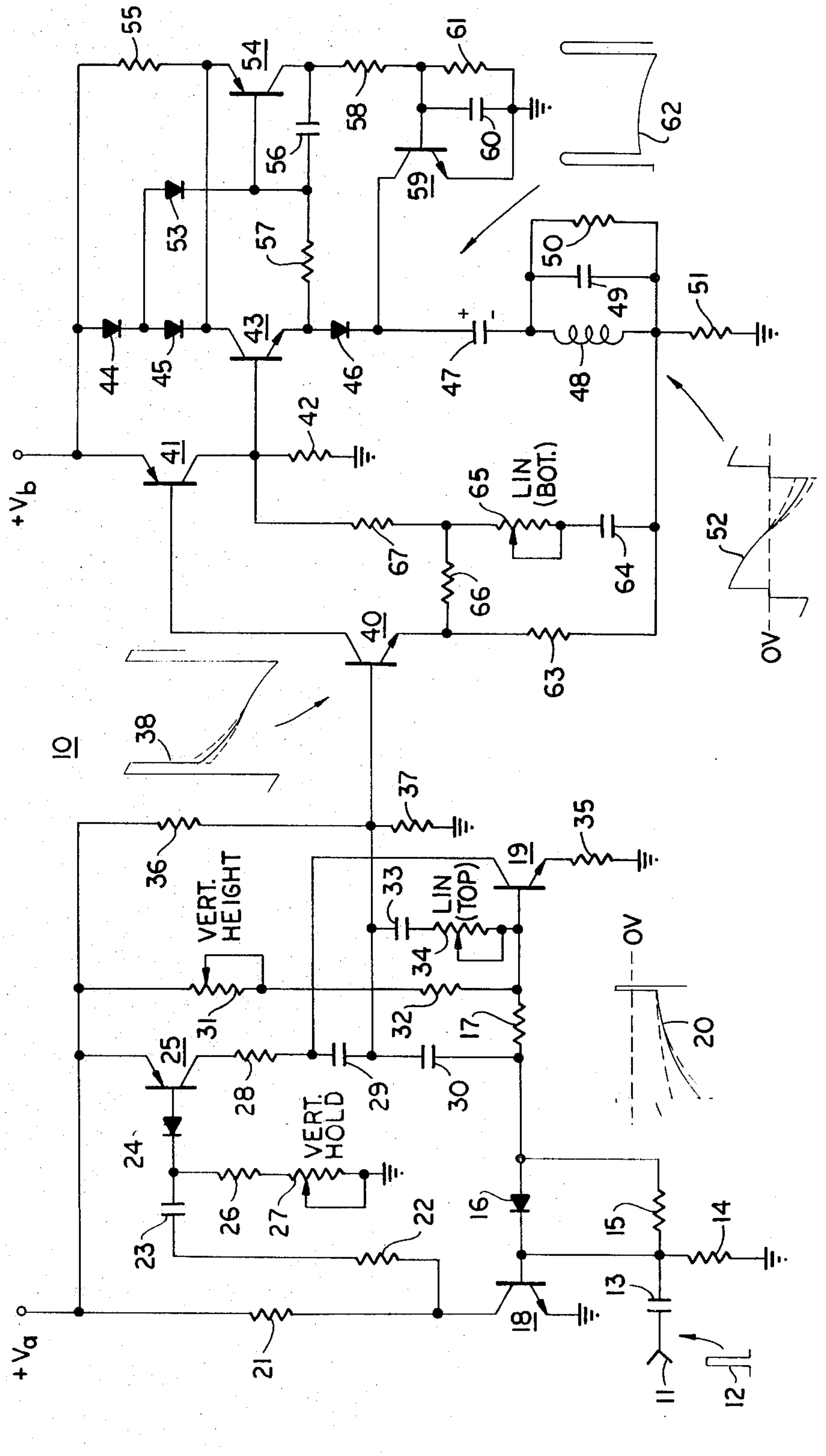

VERTICAL DEFLECTION CIRCUIT

BACKGROUND OF THE INVENTION

This invention relates to vertical deflection circuits and to an oscillator-sawtooth generator suitable for use therein.

Included in the many requirements of a television receiver necessary for displaying a satisfactory picture is the requirement that the display be as linear as possible. Nonlinearities in the receiver would show up in a vertical direction as an uneven spacing between horizontal lines, such as the lines of a crosshatch pattern generated by a suitable test signal generator coupled to the antenna terminals of the receiver, at the top or bottom of the raster relative to the center, or of the lines at the top of the raster relative to the lines at the bottom. The uneven spacing of lines at the top and bottom relative to the center is generally caused by the geometric aspect of the electron beam or beams originating from a fixed position within the picture tube and being angularly deflected over the relatively flat faceplate of the tube. This type of linearity distortion is commonly referred to as "S-distortion" and shows up as a greater spacing between horizontal lines at the top and bottom of the raster than at the center. Uneven spacing of lines at the top of the raster relative to the bottom is commonly referred to as " linearity distortion" and is generally caused by nonlinear performance of the vertical deflection circuit, which nonlinear performance can be caused by temperature changes, supply voltage variations or circuit component changes.

In the past, S-correction networks commonly used components including capacitors in feedback loops and variation in component tolerances frequently required the use of separate expensive variable linearity and S-correction controls. Additionally, picture bounce often occurred due to the relatively long time constants involved in the feedback and S-correction networks.

In accordance with one embodiment of the invention, a deflection sawtooth generator includes first and second active current conducting devices coupled by a timing network for determining the trace interval of each deflection interval. A pulse obtained from a source of deflection rate pulses coupled to a control electrode of the first device causes the first and second devices to change their state of conduction to initiate the retrace interval of each deflection cycle. A network including first and second series coupled capacitors is coupled to an output electrode of the second device and to the control electrode of the first device, the charging of which capacitors through the second device determines the retrace interval duration. The first and second capacitors are coupled to a third active current conducting device which provides a discharge path therefor for causing a sawtooth current to be developed at the junction of the two capacitors. A linearity correction network includes a third capacitor coupled in parallel with one of the first and second capacitors for receiving charge therefrom during a first portion of each trace interval for determining the rate of discharge of the first and second capacitors for providing linearity correction of the sawtooth current waveform.

In accordance with another embodiment of the invention, a vertical deflection system incorporates the sawtooth generator described above and further includes a driver stage including a feedback path, the input terminal of the driver stage being coupled to the junction of the first and second capacitors for receiving the sawtooth waveform therefrom. An output terminal of the driver stage is coupled to a power amplifier stage which in turn is coupled for supplying deflection current to a deflection winding. A second linearity correction network includes a second capacitor coupled to one terminal of the deflection winding and to a point in the feedback path of the driver stage for decoupling the feedback during a second portion of the trace interval for providing linearity correction of the drive waveform coupled to the amplifier stage.

A more detailed description of the invention is given in the following description and accompanying drawing, the sole FIGURE of which is a schematic of a vertical deflection circuit incorporating a preferred embodiment of the invention.

DESCRIPTION OF THE INVENTION

A vertical deflection system 10 embodying the invention includes a transistor 18 having its emitter electrode grounded and its collector electrode coupled to a source of positive potential $+V_a$ through a resistor 21. A source (not shown) of positive vertical sync pulses 12 is coupled to an input terminal 11 and through a coupling capacitor 13 to the base electrode of transistor 18. The collector electrode of transistor 18 is also coupled by a timing network comprising resistor 22, capacitor 23, resistor 26 and potentiometer 27 through a diode 24 to the base electrode of a transistor 25. Diode 24 is a base-emitter protection diode of transistor 25.

The emitter electrode of transistor 25 is coupled to the $+V_a$ potential. The collector electrode of transistor 25 is coupled through a resistor 28, serially coupled capacitors 29 and 30 and a diode 16 to the base electrode of transistor 18. The anode of diode 16 is coupled through a resistor 15 and a resistor 14 to ground. The junction of resistors 14 and 15 is coupled to one terminal of capacitor 13.

The junction of capacitor 30 and diode 16 is coupled through a resistor 17 to the base electrode of a transistor 19. The emitter electrode of transistor 19 is coupled through a current limiting resistor 35 to ground and the collector electrode is coupled to the junction of resistor 28 and capacitor 29. A potentiometer 31, serving as a vertical height control, is serially coupled to a resistor 32 between the base electrode of transistor 19 and the $+V_a$ potential for supplying bias to the base electrode. A linearity correction network comprising serially coupled capacitor 33 and a linearity adjustment potentiometer 34 is coupled between the junction of capacitors 29 and 30 and the base electrode of transistor 19. A resistor 36 and a resistor 37 are serially coupled between the $+V_a$ potential and ground and provide bias for a transistor 40 as well as serve to further alter the linearity of the sawtooth wave obtained at the junction of the resistors.

Transistor 40 has its base electrode coupled to the junction of resistors 36 and 37, its collector electrode coupled to the base electrode of a transistor 41 and its emitter electrode coupled through a resistor 63 and a resistor 51 to ground. Transistor 41 has its emitter electrode coupled to a source of positive potential $+V_b$ and its collector electrode coupled through a resistor 42 to ground. A resistor 67 and a resistor 66 are serially coupled between the collector electrode of transistor 41 and the emitter electrode of transistor 40 and provide direct current feedback from transistor 41 to transistor 40. Transistors 40 and 41 together form a non-inverting driver amplifier for the deflection sawtooth waveform 38 coupled to the base of transistor 40.

Transistors 43, 54 and 59 are interconnected to form a quasi-complementary symmetry voltage follower amplifier with automatic quiescent current setting for supplying a sawtooth deflection current to a deflection winding. The collector electrode of transistor 43 is coupled through two serially coupled diodes 45 and 44 to potential $+V_b$. The emitter electrode of transistor 43 is coupled through a diode 46 to the collector electrode of transistor 59, the emitter electrode of which is grounded. The junction of diode 46 and the collector electrode of transistor 59 forms an amplifier output terminal which is coupled through a coupling capacitor 47 to one terminal of a deflection winding 48, the other terminal of which is coupled through a current sampling resistor 51 to ground. A capacitor 49 and a resistor 50, each coupled in parallel with deflection winding 48, form a resonant circuit therewith and serve to limit the amplitude of the retrace pulse developed across winding 48 and determine the retrace pulse width.

A series connected capacitor 64 and a potentiometer 65 are coupled from the junction of winding 48 and sampling resistor 51 to the junction of resistors 66 and 67 in the driver stage feedback path and serve as a linearity correction network for the bottom portion of sawtooth waveform 52.

During operation the sync pulses 12 coupled to the base of transistor 18 cause it to conduct, initiating the retrace interval. Conduction of transistor 18 causes a lower potential to be applied to the base electrode of transistor 25 causing it to conduct. With transistor 25 conducting, serially coupled capacitors 29 and 30 charge through the conduction path from the $+V_a$ potential source, transistor 25, resistor 28, diode 16 and the base-emitter junction of transistor 18. The waveform obtained at the anode of diode 16 with reference to ground is the waveform 20 with the positive spike portion representing the retrace interval.

During the retrace interval there is an increased current through transistor 19 to ground, which current is limited by the emitter resistor 35. This increased current arises because the junction of capacitor 30 and resistor 17 is clamped via the conducting diode 16 and the saturated transistor 18. This disables the negative feedback of transistor 19 between its collector and base through the series coupled capacitors 29 and 30 and resistor 17. Waveform 20 shows the increased voltage of the junction of capacitor 30 and resistor 17 during the retrace interval. Towards the end of the retrace interval when the charge current through capacitors 29 and 30 decreases below the current through transistor 19 the voltage at the junction of capacitor 30 and resistor 17 decreases caused by the initial discharge current from capacitors 29 and 30 through transistor 19. This decreasing voltage at the anode of diode 16 cuts off diode 16 and transistor 18. As transistor 18 cuts off its collector voltage increases positively, which increase is coupled through capacitor 23 and cuts off transistor 25. As transistor 25 cuts off the collector voltage of transistor 19 decreases rapidly as shown by the trailing edge of the retrace pulse portion of waveform 38. Thus, the essential retrace timing components are resistor 28 and capacitors 29 and 30. Current limiting resistor 28 is selected to determine the duration of the retrace interval.

With transistors 18 and 25 cut off, initiating the trace interval, capacitor 23 has a charging path from the $+V_a$ potential source through resistors 21, 22, 26 and potentiometer 27 to ground. The time constant of this circuit determines the trace interval. As the charging current of capacitor 23 diminishes, transistor 25 is readied for conduction. The vertical hold potentiometer 27 is adjusted such that transistor 25 is held in cut off by charging of capacitor 23 for a slightly longer period than in the period between incoming vertical sync pulses 12. In this manner, under normal conditions, sync pulses 12 determine the oscillator period. In the absence of sync pulses such as caused by a temporary sync drop out, the oscillator portion of the circuit will function with the trace timing determined by the charging of capacitor 23.

At the start of the trace interval with transistors 18 and 25 cut off, capacitors 29 and 30 have a discharge path through transistor 19 and resistor 35 to ground on one side and through resistor 17 and the series connection of resistors 31 and 32 on the other side. A constant biasing current is provided to the base of transistor 19 from the $+V_a$ potential source via the vertical height potentiometer 31, and the resistor 32. This biasing current causes transistor 19 to conduct heavily, producing a discharge current of opposite direction through resistor 17, which current subtracts from the biasing current and provides a constant current discharge of capacitors 29 and 30 by virtue of this negative feedback around transistor 19.

A first linearity correction network comprising capacitor 33 and linearity potentiometer 34 is coupled in parallel with capacitor 30. The combined resistance of potentiometer 34 and resistor 17 is selected of a relatively high value such that capacitor 33 receives substantially no charge during the relatively short retrace interval. However, during the trace interval, capacitor 33 is charged by capacitors 29 and 30. Capacitors 29 and 30 are selected to be of substantially equal value. Thus, the voltage at their junction is approximately one half the $+V_a$ potential minus the voltage drop across resistor 28. This voltage drop is caused by the sum of the current through transistor 19 and the charge current through capacitors 29, 30 during the retrace time. Thus, capacitor 33 is charged during the first half of the trace interval and thereby alters the discharge current of capacitors 29 and 30 through transistor 19 during this first trace portion. The effect of capacitor 33 receiving charge from capacitors 29 and 30 is illustrated by the dotted line portions of sawtooth waveforms 38 and 20 which are obtained at the junction of capacitors 29 and 30 and the junction of capacitor 30 and resistor 17, respectively. By varying the amount of resistance of linearity potentiometer 34, the slope of the sawtooth waveform during the first half of the trace interval can be varied, thus providing the desired linearity correction.

Resistors 36 and 37 form a voltage divider between the $+V_a$ potential source and ground. The voltage at the mid-point of these resistors provides the bias voltage for driver transistor 40. Additionally, resistors 36 and 37 provide a discharge path for capacitors 29 and 30 such as to add a slight parabolic shape to the sawtooth waveform 38 to provide S-correction.

The sawtooth waveform 38 coupled to the base electrode of transistor 40 is amplified by transistors 40 and 41 comprising the driver stage and appears uninverted as a negative going sawtooth at the base electrode of transistor 43 of the quasi-complementary symmetry output amplifier. Feedback resistors 67 and 66 establish the DC operating point of transistor 43.

In the absence of a sawtooth drive waveform coupled to the base electrode of transistor 43, the quiescent current of transistors 43 and 59 is determined by transistor 54. The base electrode of transistor 54 is forward biased by the voltage drop across diodes 44 and 53 in the biasing path comprising diodes 44 and 53, resistor 57, diode 46 and transistor 59. The quiescent current is determined by the value of resistor 55. The collector current of transistor 54 conducted through resistors 58 and 61 forward biases transistor 59, which draws its collector current from the emitter of transistor 43, thus establishing the quiescent current path from the $+V_b$ supply through diodes 44 and 45, transistor 43, diode 46 and transistor 59 to ground.

During the positive half portion of the sawtooth drive waveform similar to waveform 38, transistor 43 conducts load current from the $+V_b$ supply through the parallel combination of diodes 44 and 45 and resistor 55. Diodes 44 and 45, each having a voltage drop of about 0.6 volts, limit the voltage drop across resistor 55 to 1.2 volts. The load current is conducted through diode 46, deflection winding 48 and sampling resistor 51 to charge coupling capacitor 47 with the polarity as indicated. A sawtooth voltage waveform 52, representative of deflection winding current, is developed across resistor 51 and is fed back to transistor 40 of the driver stage.

As soon as the load current of transistor 43 exceeds the quiescent current, the 1.2 volt drop across diodes 44 and 45 and resistor 55 cuts off transistor 54 which in turn cuts off transistor 59.

As the positive level of the sawtooth drive waveform decreases and the load current of transistor 43 drops below the level of the quiescent current, transistor 54 is again forward biased and conducts as its emitter voltage is no longer held equal to its base voltage by the voltage drop across diodes 44 and 45. Conduction of transistor 54 drives transistor 59 for the duration of the trace interval of the sawtooth deflection waveform. During the latter half of the sawtooth waveform, transistor 43 acts as a voltage follower for the sawtooth drive waveform which is coupled from the collector electrode of transistor 43 to the emitter electrode of transistor 54 which then supplies the signal drive to the base electrode of transistor 59.

The load current now flows from capacitor 47 through transistor 59 and up through resistor 51 and deflection winding 48 in the reverse direction from the first portion of the trace interval. During the time of maximum current through transistor 59, the quiescent current through transistor 43 is somewhat reduced by the drive current through transistor 54, which subtracts from the quiescent current. This drive current through transistor 54, necessary to drive transistor 59, is relatively small compared to the quiescent current and the quiescent current remains substantially constant.

The quiescent current control circuit maintains the substantially constant quiescent current in spite of variations in the $+V_b$ voltage supply or the effects of temperature changes on the output transistors 43 and 59 and therefore maintains the DC operating point of the output amplifier substantially constant. This reduces any linearity distortion of the sawtooth current through the deflection winding which might otherwise occur.

At the end of the trace interval transistor 43 is driven into saturation by the large positive retrace pulse portion of waveform 38 generated by the sawtooth generator. As transistor 43 is in saturation, the current through resistor 57 is zero, causing transistors 54 and 59 to be cut off. The sudden decrease in current through the deflection winding 48 causes the magnetic field of the winding to collapse, thereby generating a relatively large retrace pulse as indicated by the voltage waveform 62.

Because the quiescent current is zero during the retrace interval, the yoke is only damped by the capacitor 49 and resistor 50, which components also determine the retrace time. Winding 48 and capacitor 49 form a resonant circuit. The retrace pulse width is one half cycle of the resonant frequency. The retrace pulse amplitude is determined by the pulse width because the energy stored in the winding 48 is given by the peak deflection current. Voltage waveform 52 shows during the retrace interval portion a step at ground or zero voltage reference potential. This indicates that retrace current flows only within the components 48, 49 and 50.

Diode 46, which is poled to conduct the quiescent current and the load current of transistor 43, is reverse biased by the positive retrace pulse and effectively disconnects transistor 43 from the retrace pulse, thereby protecting transistor 43 from breakdown. As the retrace pulse falls below the voltage potential at the emitter of transistor 43, diode 46 starts to conduct and effectively reconnects transistor 43 and, in conjunction with the quiescent current circuit including transistor 54 which now starts to conduct, also connects transistor 59 to the winding 48. This damps the winding 48 such that no ringing occurs. Since the retrace pulse amplitude is independent of the $+V_b$ voltage, the $+V_b$ voltage can be chosen as low as required by the trace voltage whereby a considerable power saving is achieved.

The relatively high current supplied by transistor 41 of the driver stage eliminates the need for the commonly used bootstrap capacitor coupled in a feedback path from the output stage to the driver stage. This eliminates the cost of the capacitor as well as the possibility of tolerance variations from one capacitor to another causing linearity distortion and necessitating additional linearity controls.

The second linearity correction network comprising capacitor 64 and potentiometer 65 serves to decouple a portion of the DC feedback in the driver stage and permits the slope of the sawtooth waveform to be altered during the second half of the trace interval as represented by the dotted curved portions of waveform 52. Thus, the circuit described permits adjustment of the slope of the deflection sawtooth current independently at the portions corresponding to the top and bottom of the raster by respective linearity control potentiometers 34 and 65 to the extent that only one set of controls provides satisfactory linearity and S-correction control.

A listing of the types and values of the circuit elements utilized in the illustrated embodiment is as follows:

| | |
|---|---|
| Transistor 18 – BC107 | Transistor 54 – BC307 |
| Transistor 19 – BC107 | Diode 16 – BAX13 |
| Transistor 25 – BC177 | Diode 24 – BAX13 |
| Transistor 40 – BC147 | Diode 44 – 1N4001 |
| Transistor 41 – BC557 | Diode 45 – 1N4001 |
| Transistor 43 – BD233 | Diode 46 – 1N4001 |
| Transistor 59 – BD235 | Resistor 36 – 68K |
| Resistor 14 – 100K | Resistor 37 – 6.8K |
| Resistor 15 – 220K | Resistor 42 – 2.2K |
| Resistor 17 – 15K | Resistor 50 – 4.7K |
| Resistor 21 – 82 | Resistor 51 – 0.68 |
| Resistor 26 – 47K | Resistor 55 – 5.6 |
| Resistor 27 – 100K | Resistor 57 – 2.2K |
| Resistor 28 – 220 | Resistor 58 – 22 |
| Resistor 31 – 470K | Resistor 61 – 1.5K |
| Resistor 32 – 82K | Resistor 63 – 2.2K |
| Resistor 34 – 20K | Resistor 65 – 4.7K |
| Resistor 35 – 470 | Resistor 66 – 3.9K |
| Capacitor 23 – 0.47uf | Resistor 67 – 15K |
| Capacitor 29 – 0.47uf | Capacitor 56 – 1000uuf |
| Capacitor 30 – 0.47uf | Capacitor 60 – 0.01uf |
| Capacitor 33 – 0.68uf | Capacitor 64 – 20uf |
| Capacitor 47 – 680uf | Capacitor 49 – 2.2uf |

What is claimed is:

1. A sawtooth generator for a deflection system, comprising:

first and second active current conducting devices;

a timing network coupled to an output electrode of said first device and to a control electrode of said second device for determining the trace interval of each deflection cycle;

a source of deflection rate signals coupled to a control electrode of said first device for changing the conduction state of said first and second devices from a first to a second state for initiating the retrace interval of each deflection cycle;

means including first and second serially coupled capacitors coupled to an output electrode of said second device and a control electrode of said first device, said first device being responsive to the charging current of said first and second capacitors through said second device such that said retrace interval is terminated and said trace interval is initiated when said charging current reaches a predetermined amount and causes said first and second devices to change said first conduction state;

a third active current conducting device having its main conduction path coupled in parallel with said means including said first and second capacitors for providing a discharge path therefor during said trace interval; and linearity correction means including a third capacitor coupled in parallel with one of said first and second capacitors for providing an additional discharge path therefor for affecting the linearity of discharge of said first and second capacitors during a first portion of said trace interval.

2. A sawtooth generator according to claim 1 wherein said linearity correction means includes a first impedance in series with said third capacitor, said impedance being large relative to the impedance of the charging path for said first and second capacitors such that when said first and second capacitors are charged through said second device relatively little charge is stored in said third capacitor.

3. A sawtooth generator according to claim 2 wherein a second impedance is coupled from the junction of said first and second capacitors to a point of reference potential for affecting the rate of discharge of said first, second and third capacitors for altering the shape of said sawtooth waveform for linearity correction.

4. A sawtooth generator according to claim 3 wherein a diode is coupled serially between said first and second capacitors and said control electrode of said first device and poled to present a low forward impedance for current charging said first and second capacitors.

5. A sawtooth generator according to claim 4 wherein a relatively large impedance is coupled from the junction of said diode and said first and second serially coupled capacitors for providing a relatively long time constant discharge path for said first and second capacitors.

6. A deflection generator comprising:

a deflection winding;

an amplifier coupled to said winding for supplying current thereto;

a driver stage coupled to an input terminal of said amplifier, said driver stage comprising first and second active current conducting devices and a feedback path coupled from said second to said first device;

oscillator and sawtooth generating means coupled to said driver stage, said means comprising third and fourth active current conducting devices;

a timing network coupled to an output electrode of said third device and to a control electrode of said fourth device for determining the trace interval of each deflection cycle;

a source of deflection rate signals coupled to a control electrode of said third device for changing the conduction state of said third and fourth devices from a first to a second state for initiating the retrace interval of each deflection cycle;

means including first and second serially coupled capacitors coupled to an output electrode of said fourth device and a control electrode of said third device, said third device being responsive to the charging current of said first and second capacitors through said fourth device such that said retrace interval is terminated and said trace interval is initiated when said charging current reaches a predetermined amount and causes said third and fourth devices to change to said first conduction state;

a fifth active current conducting device having its main conduction path coupled in parallel with said means including said first and second capacitors for providing a discharge path therefor during said trace interval;

first linearity correction means including a third capacitor coupled in parallel with one of said first and second capacitors for providing an additional discharge path therefor for affecting the linearity of discharge of said first and second capacitors during a first portion of said trace interval;

the junction between said first and second capacitors being coupled to an input terminal of said driver stage for providing a sawtooth voltage waveform therefor during said trace interval; and second linearity correction means including a capacitor coupled to said deflection winding and a point in said driver feedback path for decoupling said feedback from said path for affecting the linearity of said sawtooth voltage during a second portion of said trace interval.

7. A deflection generator according to claim 6 wherein said linearity correction means includes a first impedance in series with said third capacitor, said impedance being large relative to the impedance of the charging path for said first and second capacitors such that when said first and second capacitors are charged through said second device relatively little charge is stored in said third capacitor.

8. A deflection generator according to claim 7 wherein a second impedance is coupled from the junction of said first and second capacitors to a point of reference potential for affecting the rate of discharge of said first, second and third capacitors for altering the shape of said sawtooth waveform for linearity correction.

9. A deflection generator according to claim 8 wherein a diode is coupled serially between said first and second capacitors and said control electrode of said first device and poled to present a low forward impedance for current charging said first and second capacitors.

10. A deflection generator according to claim 9 wherein a relatively large impedance is coupled from the junction of said diode and said first and second serially coupled capacitors for providing a relatively long time constant discharge path for said first and second capacitors.

* * * * *